May 11, 1965 W. F. HENRY ETAL 3,183,518

RECORD PERFORATING APPARATUS

Filed Dec. 4, 1961 5 Sheets-Sheet 1

INVENTORS
WILLIAM F. HENRY
HERMAN C. SCHEER
HAROLD P. WICKLUND

BY K. P. Johnson
ATTORNEY

May 11, 1965 W. F. HENRY ETAL 3,183,518

RECORD PERFORATING APPARATUS

Filed Dec. 4, 1961 5 Sheets-Sheet 2

May 11, 1965 W. F. HENRY ETAL 3,183,518

RECORD PERFORATING APPARATUS

Filed Dec. 4, 1961 5 Sheets-Sheet 3

May 11, 1965 W. F. HENRY ETAL 3,183,518

RECORD PERFORATING APPARATUS

Filed Dec. 4, 1961 5 Sheets-Sheet 5

United States Patent Office 3,183,518

Patented May 11, 1965

3,183,518

RECORD PERFORATING APPARATUS

William F. Henry and Herman C. Scheer, Endicott, and Harold P. Wicklund, Endwell, N.Y., assignors to International Business Machines Corporation, New York, N.Y., a corporation of New York Filed Dec. 4, 1961, Ser. No. 156,824
9 Claims. (Cl. 346—76)

This invention relates generally to record members, and more particularly to apparatus for marking record members with manifestations representative of data to be stored therein.

With the current wide-spread use of machines for processing data, these data are required to be stored in some manner capable of being sensed or read by the machines. A device for storing data may be necessary either for the compilation of preliminary data as input information, or for the storage of intermediate results, or for the recordation of completely processed information.

Record members often used at one or more of these stages because of stability, reliability, handling and cost are punched paper tapes and cards. However, paper tapes and cards have been displaced from a position of prominence in many applications because the perforations, representing data, could not be produced rapidly enough in such a storage member due to mechanical limitations. This type of data storage often required that buffer storage units be supplied at additional cost to temporarily store portions of the information output of the processing machine until the mechanical perforator or punch could eventually record all the information. As a result, other storage media capable of faster recordation have been resorted to, despite the advantages of punched tapes and cards.

The most common perforating method is that of driving a punch through the record member at the desired data position. Although this method produces accurately registered holes, the reciprocation of the punch mass seriously limits the cyclic rate of operation. Refinements of linkages, tolerances and cam motion, or the use of pneumatics or hydraulics for punch actuation have permitted improvement in the punching rate, but still the punch mass has to be shuttled back and forth. Also with these mechanisms the record member frequently has to be stopped at the instant of punching, which causes additional delay.

A similar method is that of using a chadless record member to eliminate stops during punching. However, the record member has to be pre-punched at each data position, thus increasing the cost of recording.

A different method is to produce perforations by electrical arcs between two electrodes on opposite sides of the moving record member. This method provides a rapid recording rate but does not produce acceptable holes for subsequent high speed sensing. The holes are generally too small for the sensing devices and are too inaccurately located to provide a reliable record. During perforating the arc may occur at any point about the periphery of the electrode so the series of perforations are not produced in alignment along the record member.

Accordingly, it is an object of this invention to provide improved high speed, marking apparatus for a record member.

Another object of this invention is to provide apparatus for perforating a record member continuously moving at high speed.

Still another object of this invention is to provide apparatus for marking a record member by controlled disintegration of the member at predetermined data locations on the member.

Yet another object of this invention is to provide apparatus for producing accurately located perforations of predetermined size in a record member by combustion.

A further object of this invention is to provide apparatus for burning perforations in a record member moving at high speed which can be sensed by conventional sensing equipment.

A still further object of this invention is to provide apparatus for coating predetermined areas of a record member with a combustible material and igniting only selected ones of the coated areas.

In accordance with the foregoing objects, this invention provides means for coating combustible material on predetermined discrete areas of a record member moved continuously along a designated path by transport means. Means is provided for selectively controlling ignition means adjacent the member to ignite particular ones of the moving, coated areas so as to result in combustion of the record member material only in those selectively ignited areas. A means is further provided to sustain and insure combustion of the ignited areas in the moving member, and an extinguishing means serves to quench the combustion of those areas after a predetermined time interval of burning to closely control the size of the consumed area. The resulting ash is subsequently cleared from the record member by residue removal means.

This invention has the advantage of providing perforations of accurate size and location should the coated areas not be ignited at their exact centers. When a data position is ignited off-center, the area coated with the combustible material burns at a much faster rate than the uncoated area. The result is that when combustion is permitted for a fixed time the perforation is formed without producing an unacceptable, mislocated hole. The invention further eliminates the requirement of reciprocating a relatively heavy punch member and the start-stop motion of the record member. Yet holes are produced which are capable of being rapidly sensed by machines.

The foregoing and other objects, features and advantages of the invention will be apparent from the following more particular description of preferred embodiments of the invention, as illustrated in the accompanying drawings.

Figure 1:
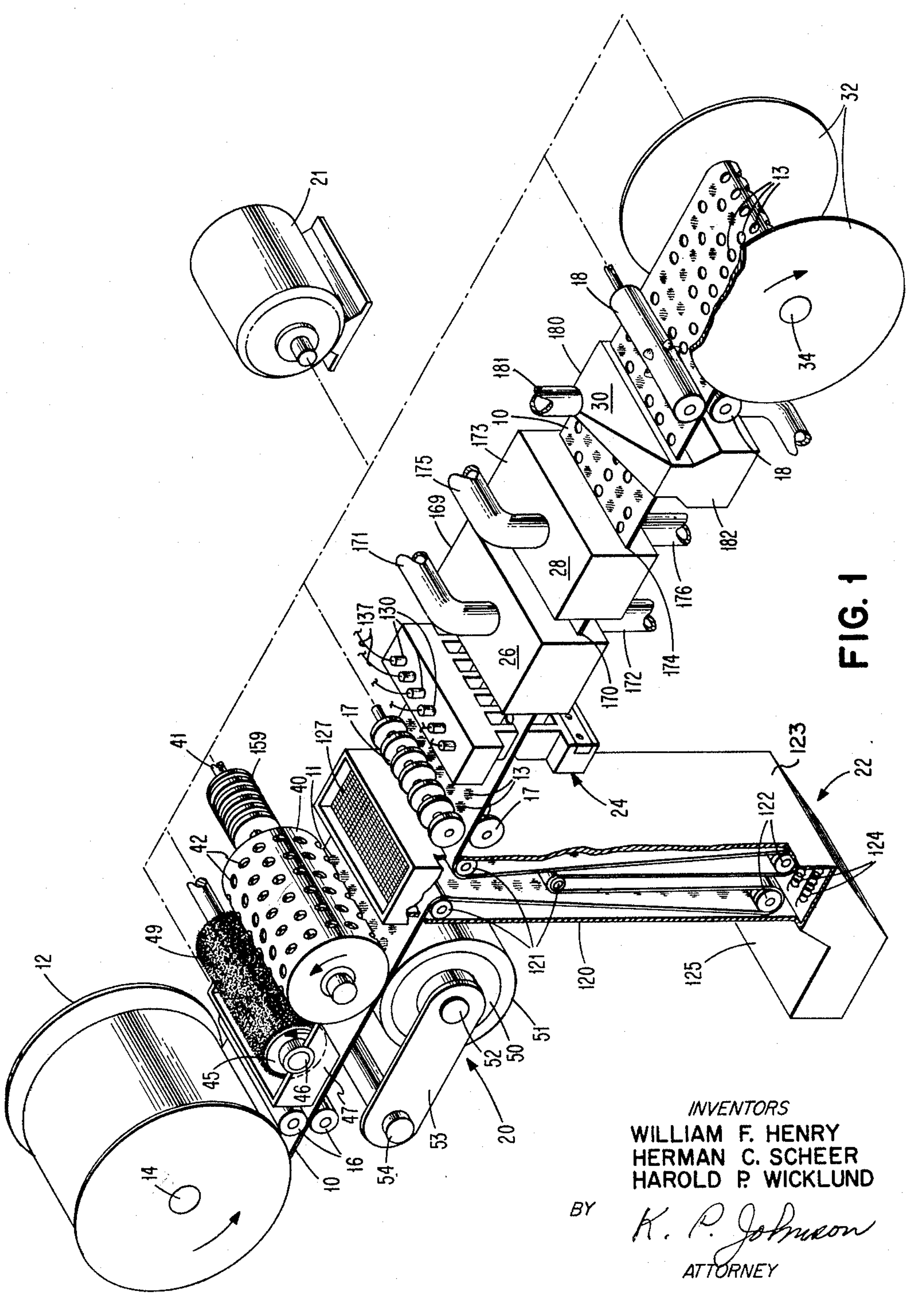
FIG. 1 is a schematic diagram of the invention showing the various operational stations employed in processing a blank record member to record data thereon in the form of perforations.
Figure 9:
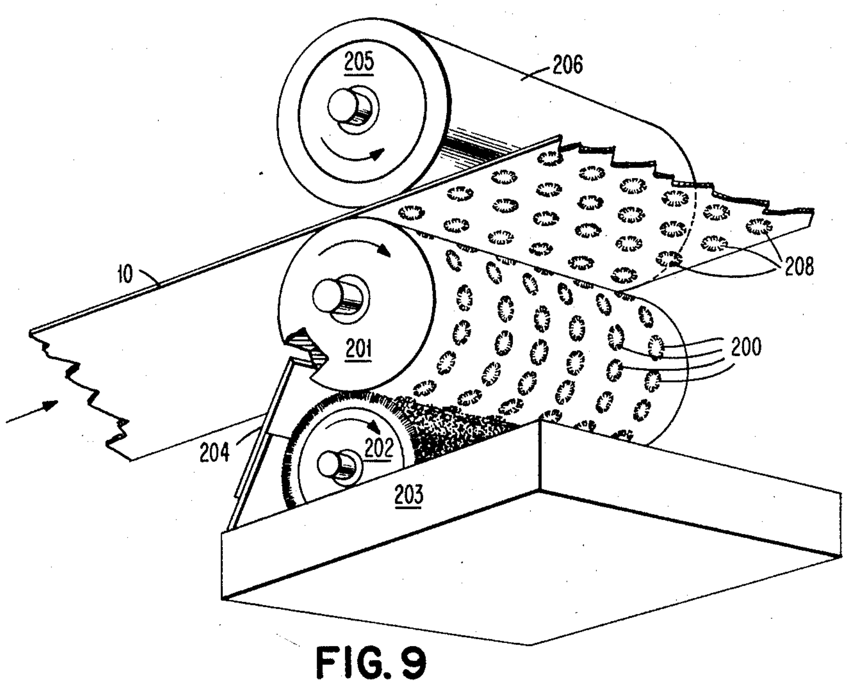
Figure 8:
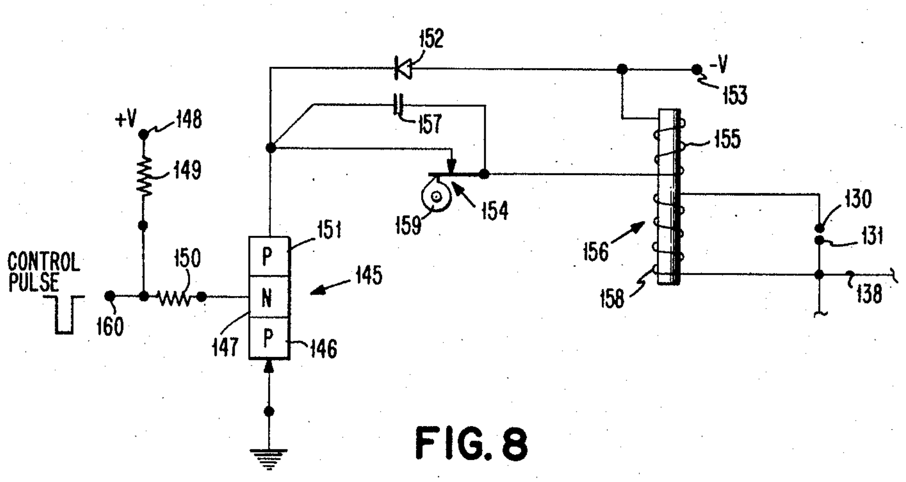
Figure 7:
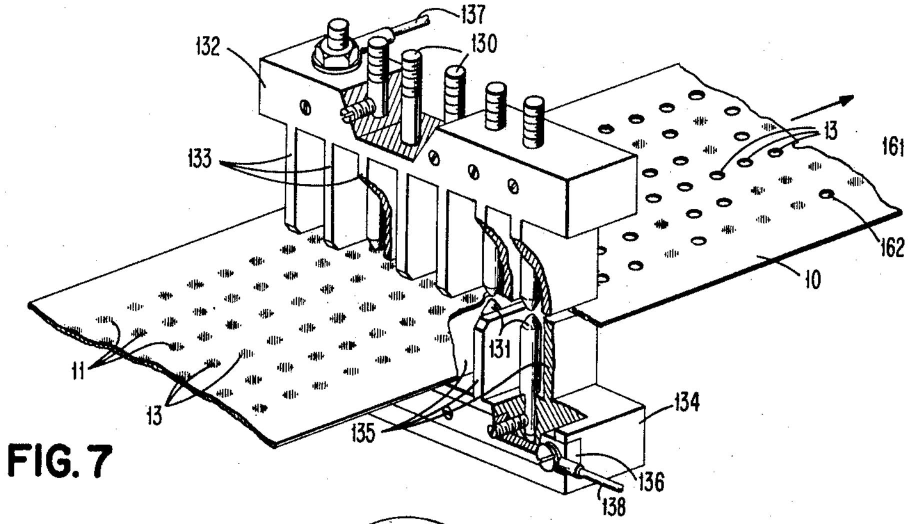
Figure 5:
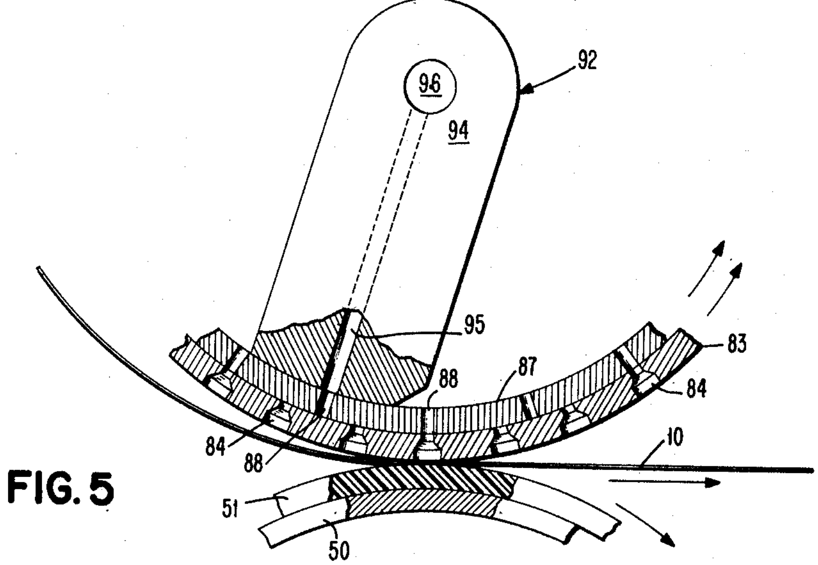
FIG. 5 is an enlarged sectional view taken on the line 5—5 of FIG. 4 showing the manifold, shutter and distributor of the alternative coating apparatus.

FIGS. *6a–6e* are schematic illustrations of the operation of the manifold, shutter and distributor shown in FIG. 5;

FIG. 7 is a perspective view of the ignition station apparatus of FIG. 1 broken away to show the arrangement of the electrodes used to ignite the coated areas of the record member;

FIG. 8 is a diagram of an electrical circuit used to control the arcing of the electrodes shown in FIG. 7; and FIG. 9 is a perspective view of a device for limiting the combustion area of the record member.

Referring to FIG. 1, there is shown schematically illustrated the recording system of the invention. A record member or tape 10, to be perforated according to coded data to be recorded therein, is stored in quantity on supply reel 12 rotatably mounted on shaft 14 and fed therefrom through a series of processing stations by synchronously rotating pairs of feed rolls 16, 17 and 18, all mechanically coupled through well-known drive means such as worms and gears, to a drive motor 21. Tape 10 is preferably of paper but may be of other combustible substance and is illustrated as a transmittal tape being perforated with data coded in accordance with a common 5-hole code. The transmittal tape shown is merely one example of various record members that can be processed by the system of the invention and is not intended as a limitation of the system herein described.

As tape 10 is fed from supply reel 12 by the aforementioned feed roll pairs 16–18, each increment thereof passes successively in continuous movement through a coating station 20 where each possible data position 11 and pin drive hole position 13 is coated with a predetermined amount of ignitible, combustible material. Pin drive hole positions may, however, be pre-punched in the conventional manner. The material used for coating will be described in more detail hereinafter. The tape section may or may not continue through a drying station 22, depending upon whether or not the combustible material coated thereon must be dried before ignition.

After passing through drying station 22, the tape is carried by feed rolls 17 to an ignition station 24 where each pin drive hole position 13 and only selected ones of coated data positions 11 are ignited in accordance with the coded data to be recorded in the tape. The ignition of an area of combustible coating causes the coating and tape to burn only in those ignited areas.

Tape 10 continues then into the oxygen-rich atmosphere of an oxygen station 26 where the burning of ignited tape areas is accelerated. Upon leaving station 26, the tape continues into a quench station 28 where all ignited areas are extinguished, thence to an ash removal station 30. At this station the residue of combustion is removed from each drive hole and each ignited data position in the tape.

The tape then continues through pin feed drive rolls 18 onto take-up reel 32 rotated in the direction of the arrow on shaft 34 by motor 21 through any suitable friction clutch arrangement. Thus tape 10 may leave supply reel 12 and pass continuously through the enumerated stations having data recorded therein at only the desired data positions 11 in the form of perforations burned therein, ending up on reel 32. With the over-all recording system having been generally described, each of the system stations will now be described in more detail.

Figure 2:
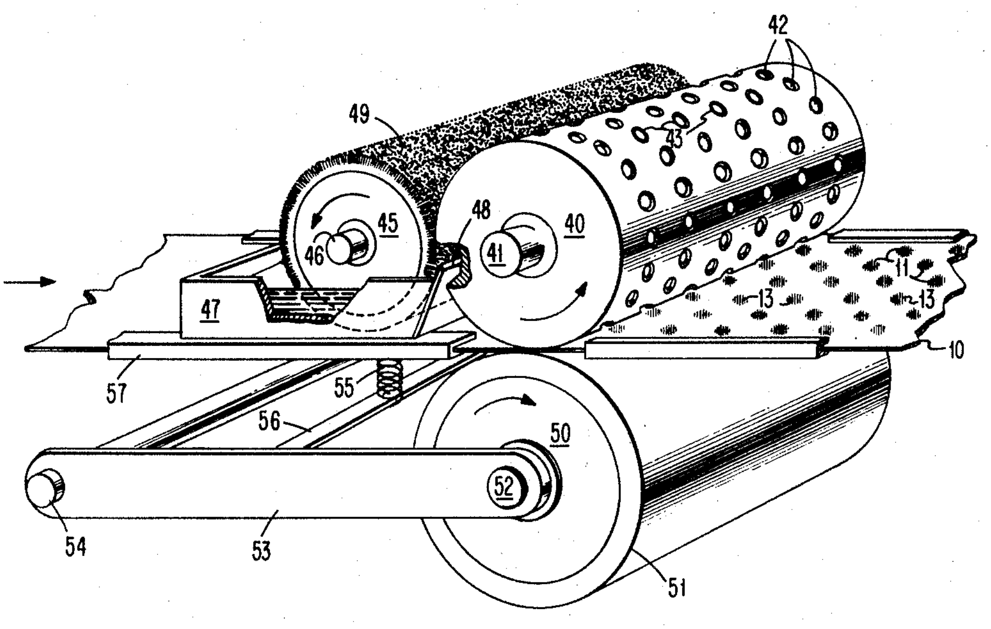
FIG. 2 is a perspective view of a coating apparatus used in the invention.

Coating station 20 is best illustrated in FIG. 2. This station comprises a coating roll 40 fixed on shaft 41 mounted for rotation and driven synchronously with the feed rolls 16–18 through a suitable shaft and gearing by motor 21 in a counterclockwise direction. Coating roll 40 has longitudinal rows 42 of depressions 43 formed, for instance by etching, in its otherwise smooth peripheral surface. The diameter and depth of the depressions is determined from the viscosity of the combustible material and the hole size desired. Depressions 43 are spaced from each other to correspond with the location of each possible data position which is to appear on tape 10. Rows 42 are circumferentially spaced from each other also in accordance with the lineal distance desired between each record character space longitudinally of tape 10. Adjacent roll 40 is an inking roll 45 fixed to shaft 46 which is rotated by motor 21 in the same direction as roll 40. The surface 49 of the inking roll rotates in contact with roll 40 and serves to successively fill depressions 43 with a combustible liquid from tank 47.

As depressions 43 of each row 42 pass in contact with inking roll 45, they are filled with a combustible liquid and continue downward into contact with a doctor blade 48 secured to the edge of tank 47. Blade 48 serves to clean the combustible liquid from the smooth surface of roll 40 leaving liquid present only in each depression 43. As the tape continues in the direction of the arrow, each row of depressions comes in contact with the surface of the tape and deposits its small quantity of liquid thereon.

In contact with the underside of tape 10, opposite coating roll 40, there is provided a pressure roll 50 having a resilient surface 51. Pressure roll 50 is mounted for free rotation on shaft 52 which is supported in a pair of arms 53 pivotally mounted on shaft 54. The pressure roll is constantly urged into engagement with tape 10 by spring 55 secured between a cross-member 56 and a tape support guide channel 57. As the coating roll rotates and tape 10 moves, the pressure roll 50 serves to insure that the tape is in printing contact with roll 40. The porous tape material withdraws the liquid from each depression so that each data position 11 and pin drive hole position 13 is coated with a fixed amount of combustible liquid.

Although the surface 49 of inking roll 45 has been shown to be of fibrous material, this surface may be a smooth hard surface to which the combustible liquid adheres. The amount of liquid carried by the inking roll to coating roll 40 may be controlled by providing a second doctor blade a short distance from the inking roll to control the quantity of liquid carried to depressions 43.

Figure 3:
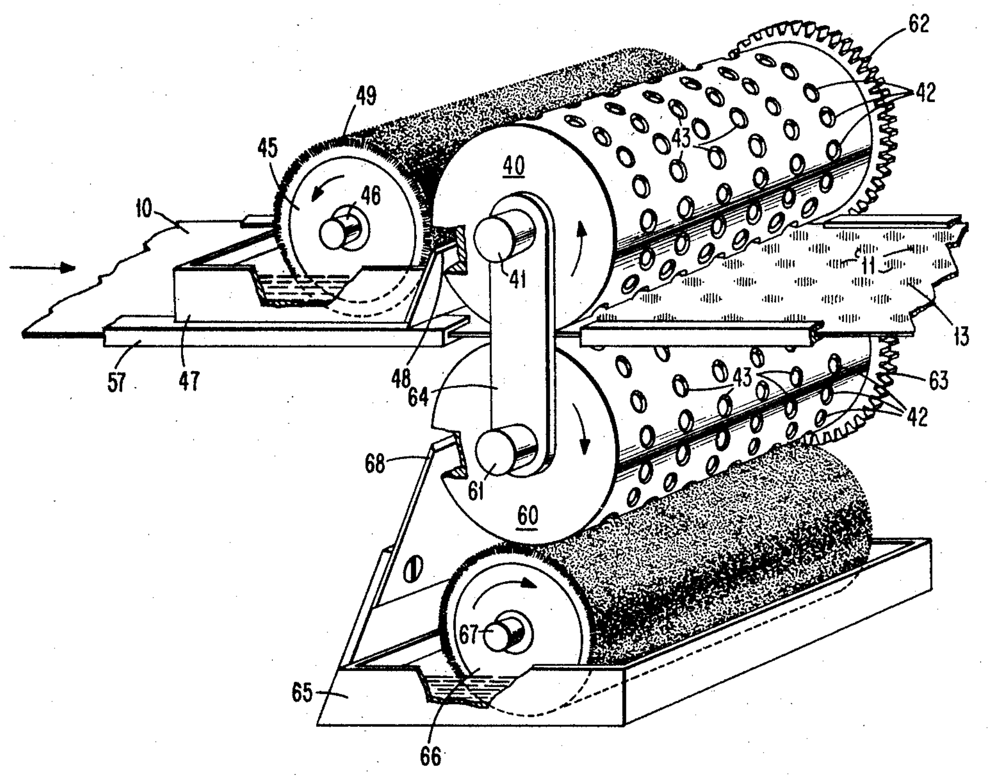
FIG. 3 is a perspective view of an alternative arrangement of a coating apparatus similar to that shown in FIG. 2.

An alternative mechanism for coating the data positions and pin drive hole positions in tape 10 is shown in FIG. 3. This mechanism is similar to that shown in FIG. 2 with the exception that pressure roll 50 and its supporting structure have been replaced by a second coating roll 60 fixed to rotatable shaft 61. The two coating rolls 40 and 60 cooperate to deposit combustible liquid on opposite sides of tape 10 in each data and drive hole position. These rolls are driven in synchronism with each other through a pair of mating spur gears 62 and 63. The coating rolls are held in tight contact with tape 10 by means of a pair of support brackets 64. Roll 60 is similarly equipped with rows 42 of depressions 43 which are filled with a combustible material from tank 65 and inking roll 66 supported on shaft 67. As inking roll 66 rotates in the direction of the arrow, combustible fluid from tank 65 is deposited on the surface of the roll and in depressions 43 in the same manner as described above for coating roll 40. Doctor blade 68 cleans excess liquid from the smooth surface of roll 60. As rolls 40 and 60 rotate in contact with tape 10, liquid is deposited on opposite surfaces of each data and drive hole position of the tape. The coating rolls are mounted so that they bear heavily against tape 10 as it moves therebetween. With this apparatus an additional quantity of combustible liquid is deposited in each tape position to provide for accelerated combustion when the positions are ignited at station 24 of FIG. 1.

Figure 4:
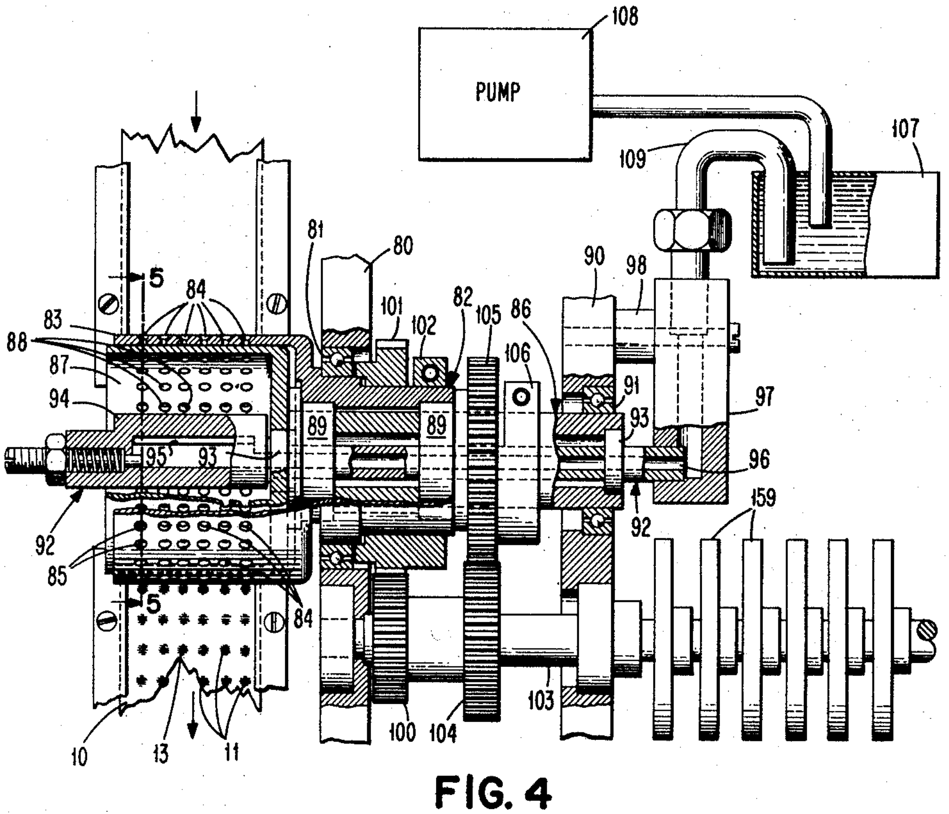
FIG. 4 is a sectional plan view of an alternative pressurized coating apparatus that may be used in conjunction with the invention.

A second alternative embodiment of a coating mechanism is shown in FIGS. 4, 5 and 6. This mechanism differs from the two foregoing embodiments in that it prints the tape positions 11 and 13 with combustible liquid supplied from a source under pressure, and meters the amount of liquid deposited on the tape. Rotatably mounted in fixed support plate 80 by bearing 81 is a tubular distributor 82 having an enlarged outer portion 83. The outer portion is provided with cavities 84 arranged in axial rows 85 spaced about its periphery. The rows are spaced in accordance with the frequency with which coated transverse rows of data and drive hole positions are to appear on tape 10. Each row of cavities 84 deposits, upon rotation, a corresponding row of droplets of combustible material transversely of the tape as the tape passes under the distributor.

There is mounted within distributor 82 a shutter 86 having a corresponding enlarged cup-like portion 87 equipped with holes 88 arranged also in axial rows similar to rows 85 of the distributor, but with each row of holes 88 spaced from adjacent rows a distance greater than that between corresponding rows 85 of the distributor. Shutter 86 is mounted for rotation within distributor 82 on bearings 89 and within fixed support plate 90 by bearing 91. The enlarged portions 83 and 87 of the distributor and shutter, respectively, are formed to provide an extremely close fit and yet permit relative rotation therebetween. The clearance between these two members is kept to a minimum to prevent leakage of combustible fluids supplied to holes 88 under pressure.

Shutter member 86 is hollow throughout its length to accommodate manifold 92 supported on bearings 93 within the shutter. Manifold 92 is tubular having an enlarged depending portion 94 at the left end thereof in FIG. 4. The enlarged portion 94 is provided with internal slot 95 serving as a duct interconnecting with channel 96 running throughout the length of the manifold 92. In FIG. 5 the lower end of depending portion 94 of the manifold is in contact with the internal surface of enlarged shutter portion 87 of shutter 86. The two contacting surfaces of shutter portion 87 and manfold portion 94 are provided with smooth surfaces formed with minimal clearance to permit relative motion between the two elements.

As seen in FIG. 4, the right end of manifold 92 is threadedly connected with a suitable elbow 97 attached to support plate 90 through spacer 98. With elbow 97 thus secured, manifold 92 is held in fixed relation to plates 80 and 90. Distributor 82 is rotated within plate 80 by spur gear 100 meshing with spur gear 101 secured by a hub clamp 102 to distributor 82. Driving gear 100 is fixed on a drive shaft 103 suitably supported for rotation within support plates 80 and 90 by motor 21. Likewise, shutter 86 is rotated on bearings 89 within distributor 82 by gear 104 in mesh with shutter gear 105 secured to the shutter by hub clamp 106. Spur gear 104 is also fixed on drive shaft 103. Distributor gear 101 and shutter gear 105 are secured to their respective elements by hub clamps in order to facilitate a timing adjustment which will become apparent below.

As with the coating mechanism shown in FIG. 2, pressure roll 50 is used with this alternative mechanism and is illustrated in FIG. 5. However, the pressure roll and its supporting structure are similar to that used for the above mechanism and need not be described here.

Combustible liquid from container 107, maintained under pressure by any suitable pump 108, is supplied through duct 109 to elbow 97 thence to channel 96 within manifold 92 and to slot 95 interconnecting with holes 88 in shutter portion 87. As shutter 86 is rotated by gears 104 and 105, each of the holes 88 in each axial row of the shutter will be filled with the combustible liquid from container 107.

It will be noted that spur gears 100 and 104 are fixed to drive shaft 103 but are different sizes. Gear 100 is smaller than gear 104 and drives distributor gear 101, larger than shutter gear 105. The result is that as drive shaft 103 rotates, distributor 82 will rotate in the same direction but slower than shutter 86. This relative motion of the shutter within the distributor is provided to meter the pressurized combustible liquid to the distributor cavities without permitting the liquid to reach tape 10 under pressure.

Figures 6A, 6B, 6C, 6D, 6E:
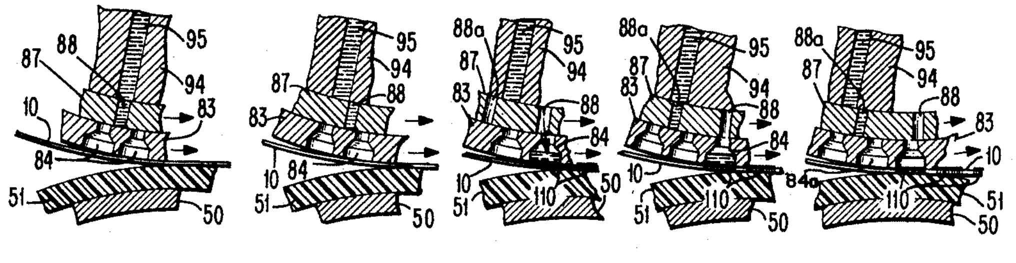

The manner in which combustible liquid is applied to tape 10 is best illustrated in FIGS. 5 and 6. In FIG. 5, combustible liquid is supplied under pressure to channel 96 then through slot 95 to a hole 88 in shutter portion 87. Stationary manifold 92 is displaced to the left from a vertical position in the figure, and, since the manifold is stationary and shutter 87 is rotating in a counterclockwise direction (indicated by the arrow), a filled hole 88 will pass beyond slot 95 so that shutter blocks additional flow from the slot. In FIGS. 6*a*–6*e*, the metering action of the shutter is illustrated by the rotational progression of both the shutter and distributor. In FIG. 6*a*, hole 88 is directly connected with slot 95 and filled with combustible liquid. Filled hole 88, however, does not connect with any of the distributor cavities 84. As seen in FIG. 6*b*, shutter 87, after having moved some distance, does not connect with either slot 95 or distributor cavity 84. In FIG. 6*c*, continued movement of shutter 87 relative to distributor 83 thus brings filled hole 88 into connection with cavity 84 of the distributor allowing the combustible liquid to fall into the cavity and onto the surface of tape 10 in the form of droplet 110. Thus, the pressure is relieved from the combustible liquid as it is deposited on the tape.

In the meantime, a succeeding hole 88*a* approaches alingment with slot 95. FIG. 6*d* shows that succeeding hole 88*a* has been filled from slot 95 and hole 88 has drained its liquid onto the tape through cavity 84. FIG. 6*e* is similar to FIG. 6*b* except that hole 88*a* has passed beyond the slot 95 and approaches cavity 84*a*. Thus, another droplet will be deposited on the surface of the tape subsequent to droplet 110.

From the foregoing description of the shutter, manifold and distributor, it is evident that hole 88 is required to connect with cavity 84 at approximately the time that the cavity is directly over pressure roll 50. Prior to that time, hole 88 will have been filled from slot 95 and passed the slot. Therefore, the position of manifold 92 and the rotational velocity of shutter 87 is dependent upon the number of rows of holes and cavities in the shutter and distributor, and the peripheral velocity of the distributor.

As an example of a suitable arrangement, the shutter may have two-thirds the number of hole rows evenly spaced about its periphery as there are rows of distributor cavities. Shutter velocity would then be one and one-half times the distributor velocity. The manifold is displaced from the perpendicular (to the left in FIGS. 5 and 6) to connect with the shutter hole immediately adjacent the hole already connected with the cavity that is directly over pressure roll 50. The number of cavities in distributor 83 depends, of course, on the frequency of data positions desired on tape 10.

The movement of the shutter with respect to the distributor is controlled by the relative sizes of mating spur gears 100, 101, and 104, 105. Since gears 100 and 104 are fixed to a common shaft 103, their pitch diameters and the diameters of the respective mating gear are selected to produce the desired relative motion between distributor 83 and shutter 87. As mentioned above, gears 101 and 105 are preferably secured to the respective distributor and shutter by a clamped split hub arrangement to provide a convenient adjustment for achieving the proper coincidence between shutter holes 88 and distributor cavities 84 when the cavities reach pressure roll 50.

As tape 10 is coated with combustible liquid material, it may or may not be passed through drying station 22. If the liquid can be ignited as applied, the drying station is omitted and the tape continues directly to ignition station 24 through feed rolls 17. However, if the combustible material has been combined with a liquid carrier merely for application purposes then drying station 22 is used to drive off the carrier leaving the combustible material coated on the tape data positions.

As seen in FIG. 1, the drying station includes a housing 120 in which there are supported suitable upper feed rolls 121 between which are spaced lower feed rolls 122. These feed rolls are similar to the feed rolls 17 shown outside duct 120. Tape 10, after being coated, enters a slot on the left side of the duct and is threaded in zig-zag fashion alternately between an upper feed roll 121 and a lower feed roll 122. The bottom portion 123 of the duct is equipped with heating elements 124 which may be electrical resistance elements. A blower 125 forces air past the heater elements along the coated surfaces of the tape and out through grille 127 at the top of duct 120. The number of upper and lower feed rolls and the size of drying chamber 120 may be varied according to the amount of time necessary to properly dry the coated material on the tape surface.

After the tape 10 has been coated at station 20 and dried, if necessary, at station 22, it then continues through ignition station 24 where selected ones of data positions 11 and all pin drive holes 13 are ignited by electrical arcs produced between upper electrodes 130 and lower electrodes 131, best seen in FIG. 7. Upper electrodes 130 are supported by any suitable means in an upper comb member 132 of dielectric material and extend below the base portion to a position between tooth portions 133. Similarly, electrodes 131 are supported in comb member 134 also of dielectric material, and extend upward toward tape 10, positioned between both portions 135. Electrodes 131 are connected in common to a terminal bar 136 supported on comb member 134. Comb members 132 and 134 are supported so that the upper and lower electrodes 130 and 131, respectively, are in alignment to form an electrode pair for each longitudinal column of data positions or pin drive holes. Minimal clearance is maintained between tooth portions 133 or 135 and tape 10 so that these portions serve as a guide and support for tape 10 as it moves past the electrodes. Electrodes 130 and 131 are preferably pointed at the ends adjacent the tape so that the electrical arc produced between the electrodes of a particular pair can be accurately located. Since repetitive arcing across two electrodes produces erosion and shortening the electrodes, they are made of extra length for subsequent adjustment within their respective supporting combs. The adjustment of the electrodes is maintained so that only an operational minimum of clearance exists between the electrode end and the tape surface.

As shown in FIG. 7, each upper electrode 130 is equipped with an electrical conductor 137 from an independent arc control circuit. As noted above, the lower electrodes 131 are each connected to a common terminal bar 136 which is in turn connected to a conductor 138.

A control circuit for producing an arc across a mating upper and lower electrode pair is shown in FIG. 8. This circuit is intended merely as one of several which may be used to produce selective arcing between the electrodes. The circuit employs a PNP transistor 145 having its emitter 146 tied directly to ground. Its base 147 is suitably biased by positive voltage source 148 through resistors 149 and 150 to maintain the transistor cut off. Collector 151 is connected through diode 152 to a negative voltage source 153. A parallel collector circuit for transistor 145 is provided through the points of circuit breaker 154 and the primary winding 155 of an ignition coil 156 to the negative voltage source 153. Capacitor 157 is placed across circuit breaker points to reduce arcing at those points. The ends of a secondary winding 158 of the ignition coil are tied to the respective electrodes 130 and 131.

The foregoing type of circuit is provided for each of the six pairs of upper and lower electrodes 130 and 131 shown in FIG. 7. All electrode pairs are conditioned by multi-lobe circuit breaker cams 159 (FIGS. 1 and 4) to produce ignition arcs at the time each transverse row of coated data positions 11 and coated pin drive hole area 13 reaches the electrodes. The cams may be conveniently fixed either to drive shaft 41 of the coating apparatus shown in FIGS. 1, 2 or 3, or to shaft 103 of the alternative coating apparatius of FIG. 4. These cams are positioned on the drive drive shaft so that a lobe on each cam closes its contacts 154 of the respective control circuit once each time a transverse row of coated areas passes under the electrodes at station 24.

At any time the circuit breaker points are closed, a negative control pulse from an external source, synchronously timed with the circuit breakers, may be applied at terminal 160 in FIG. 8 to switch transistor 145 ON to, in turn, energize primary winding 155 closed contacts 154. This coincident occurrence of circuit breaker closure with a control pulse produces an arc across the electrode pair of the respective control circuit to perforate the tape and ignite the combustible material at either a data position or pin drive hole area, depending upon the electrode pair energized. Thus, by applying control signals at terminal 160 in accordance with the coded data output from a remote data processing machine, various combinations of data positions 11 may be ignited to consume the tape and combustible material in only selected areas. The electrode pair for pin drive holes 13 is regularly pulsed for each possible position, while data positions 11 are ignited only according to the data to be stored therein. For example, in FIG. 7, two data position holes have been ignited in transverse row 161 and three positions have been ignited in row 162 in conformance with the well-known 5-hole code used here for illustration.

Only the ignition of selected coated areas is necessary at station 24, so that the tape may move continuously along its path. The burning of an ignited area continues as the tape travels because of the highly combustible coating. Once ignited, the tape and coating will rapidly burn only to the boundary of the coating where the absence of the coating reduces the combustion rate to that of the tape alone. Therefore the ignited areas burn until they substantially conform to the outline of the coated area. Any resulting irregularity along the hole periphery is negligible compared to the area subjected to controlled consumption by the combustible material.

As each transverse row of positions is selectively ignited, the tape continues along its path to oxygen station 26, shown in FIG. 1. At this station the tape passes through oxygen-enriched atmosphere which insures the burning of any ignited areas. The station is an enclosure 169 about the tape path and has similar entrance and exit slots 170 for the tape. Oxygen is supplied to the enclosure through duct 171 from any suitable pressurized source and any excess is forced out of the enclosure via port 172. The length of the enclosure is determined by the size of discrete coated areas, the burning rate of the ignited areas, and tape velocity. When tape speed is extremely fast, the enclosure may take the form similiar to that of drying station 22 in which the tape follows a tortuous path in order to prolong the time during which the tape is in the presence of the oxygen atmosphere. Should explosive type material be used for the combustible coating, then the oxygen station may optionally be omitted.

As the ignited tape areas complete combustion at station 26, exiting via slot 170, the tape continues immediately into quench station 28 which comprises a chamber supplied with carbon dioxide which prevents further oxidation of any ignited area. The quench chamber 173, having entrance and exit slots 174 therein, is similar to previous station 26 except that carbon dioxide instead of oxygen is supplied through the respective intake and exhaust ducts 175 and 176. The length of station 28 is dependent upon the time necessary to extinguish all sparks.

Although each ignited area is extinguished at station 28, an ash or residue of combustion may still be present in the newly formed perforations. Therefore, a subsequent ash removal station 30 is provided. This station includes a directive hood 180, to which compressed air is supplied through a duct 181, and which is coextensive with the width of the tape passing thereunder. Immediately below hood 180 is an evacuated chamber 182 into which is drawn all loosened particles of residue. As the perforated tape subsequently leaves station 30, it is carried along its path by pin feed rolls 18 driving the tape through newly-formed drive holes 13, and is wound on take-up reel 32.

After a data tape has been recorded in accordance with the above described system, it may then be placed on a tape reading device as a source document. Although data holes 11 may have slightly irregular peripheries, the holes prepared by this system are suited to high speed scanning by photosensing devices now well-known. Photo-responsive devices do not require the hole registration accuracy and size of opening required by other sensing devices. Therefore, transmittal tapes may be recorded at increased speeds which are compatible with the data output rate of many calculators currently in use.

However, in the event that a tape recorded in this manner should be required for sensing by mechanical devices, the invention may be modified to improve hole registration and regularity. Such a modification is shown in FIG. 9 and comprises an additional coating station similar to that shown in FIG. 2, but which is located prior to the latter as the first printing station. This coating apparatus differs from that shown in FIG. 2 in that the depressions 200 in coating roll 201 are formed to print circles 208 of combustion inhibiting compound about each data and pin drive hole position. The inhibiting substance is supplied to coating roll 201 by an inking roll 202 which is rotated in a supply tank 203 of the inhibiting compound. Roll 201 is rotated in synchronism with the roll for printing combustible material so that printed rings 208 are concentric with the printed data and pin drive positions. The inhibiting substance may be a wax or paraffin which, when applied to the tape fibers, forms a dense coating on the fibers and prevents rapid combustion. A doctor blade 204 cleans the excess material from the surface of roll 201, leaving the depressions in the coating roll filled so that upon contact with tape 10 the inhibiting material is printed out around each data position. A pressure roll 205 having a resilient surface 206 thereon is maintained in contact with the tape directly opposite coating roll 201. While this auxiliary station has been illustrated as printing inhibiting rings on the lower tape surface, it may also be adapted to print the top surface of the tape, similar to the device of FIG. 2, or both surfaces, similar to the device of FIG. 3.

With the inhibiting rings surrounding each data position, the tape may then be moved to subsequent coating station 20 (FIG. 1) where combustible material is applied to the data positions proper within rings 208. The tape then passes through the above-described sequence of stations, and when ignited at particular selected areas, those areas will burn out to the inhibiting ring which drastically slows any further combustion of the tape. By providing an inhibiting means for each ignited position a more regular hole periphery is produced and hole registration is accurately controlled.

The combustible material which is to be coated on the discrete data positions, its method of application, and the quantity applied are the results of several variables to become known when a specific system is to be used. These variables include the recording rate, record thickness, discrete area density, hole size and contour, sensing device capabilities, record member porosity, and coating combustion rate. A wide choice of well-known combustible materials is available so that the handling and combustion characteristics of the individual materials must be considered in a specific system. These materials may be liquid or solid, compounds applicable alone or in solution with other compounds or with a carrier, and relatively slow burning or explosive. Some may be ignited in liquid form and others only in a solid state. Therefore, a choice of a particular combustible material is to be considered in light of its own characteristics and in view of the requirements of the particular system to be used. Since many compounds are suitable for use with the invention, these compounds and their characteristics will be discussed by groups below.

Some materials may be coated and ignited without drying and can be applied as commercially available compounds. These materials include, for example, benzene, toluene, zylene, ethanol, methanol, propanol, hydrazine, aniline and ethylaniline. Naphthas having a relatively low boiling point may also be used.

When these compounds are employed, a single coating station 20, as shown in FIGS. 2, 3 or 4, is required and drying station 22 is omitted. Since these materials are liquid, a station for printing inhibiting rings (FIG. 9) may be necessary to prevent materials from "bleeding" excessively along the tape fibers. The bleeding produces irregular hole edges upon combustion. The seriousness of bleeding depends upon the compactness of paper fibers and the "wettability" of the coated material.

Other materials are commercially available as a solid, usually in crystalline form, and may be finely ground and dispersed in a lacquer which serves to bind the combustible solids to the record member. Examples of these solid materials are gunpowder, metal hydrides such as lithium, potassium or sodium, potassium nitrate, sodium nitrate, and sodium chlorate. Lacquers that can be used as carriers for coating purposes include, for instance, nitrocellulose, cellulose acetate, or ethyl acetate used with suitable diluents.

When solid combustible compounds are used as the combustible coating, the finely ground solid is dispersed in the lacquer and printed on the discrete areas by the coating apparatus of either FIGS. 2, 3 or 4. The coated tape is then passed through drying station 22 where the diluent of the lacquer is driven off, leaving the ground solid bound to the tape surface by the lacquer base remaining. Upon drying the mixture, the tape is then ready for perforating at ignition station 24.

Some of the solids mentioned above, e.g., metal hydrides are best placed in a suitable solvent for printing, but these hydrides are preferably printed and dried in an inert atmosphere to suppress any reaction until the ignition station is reached since oxidation readily occurs in an air atmosphere. The printing and drying can be accomplished in an enclosed chamber to which gaseous nitrogen is supplied to provide an inert atmosphere.

The materials mentioned up to this point generally provide rapid combustion with sufficient heat to accelerate the combustion of the record member in the particular areas ignited. Still other compounds may be used which produce definite explosions upon ignition; the reaction of these compounds is so rapid that the perforation is blown through the tape. There is a lack of sustained heating to permit combustion of the record member itself. When holes are produced in this manner, however, the tape may be used subsequently with a photosensing device which is effective where mechanical sensing elements prove unreliable because of the irregular hole periphery. These explosive compounds include nitrogen trichloride, lead azide, mercury fulmanate, and ammonium tri-iodide. These materials are commercially available as solids and are applied in extremely well controlled quantities in a lacquer. After application of the materials to the record member, the coated areas are then passed through drying station 22 to ignition station 24 where they can be selectively ignited.

The rapidity with which the combustion of the coating and record member occurs is, of course, dependent upon the density of combustible material present and the rate of oxidation. Therefore, the combustion can be controlled by the dispersion deposited on the record member and the supply of oxygen available to support combustion. Control through dispersion depends upon the quantity of liquid which the coating means can deposit at each discrete area, and in the case of solid material, the proportion of carrier used for the material. Thus, the depth of coating roller depressions 43 and the size of the shutter holes 88 (FIG. 5) may be varied commensurate with the material to be coated. The solid compounds can easily be controlled by varying the ratio of compound to lacquer.

The combustion rate may also be controlled by governing the availability of oxygen during burning. This may be done by supplying an oxidizing compound as a coating applied to the record member prior to the deposition of combustible material or subsequent thereto depending upon the state of the material deposited. With this procedure, one material should be a solid, the other a liquid. Multiple printing stations are required with drying stations appropriately located between printing stations as necessary for the material used. Examples of oxidizing materials suitable for this system are hydrogen peroxide, nitric acid, potassium nitrate, perchloric acid, and nitronium perchlorate.

When these latter materials are used to increase the oxygen supply, one of the rapid burning solids is first printed on the record tape and passed through a drying station. The tape then continues to a second coating station where one of these oxidizing agents is applied in liquid form. The tape, having a dual coating is then presented at the ignition station for selective perforation.

The oxygen supply may alternatively be varied at the combustion sustaining station. This control is less effective than with the provision of oxidizers. The alternative control is effected by increasing the oxygen content of the atmosphere within the sustaining station chamber 169 or by altering the length of the chamber to in turn change the time during which oxygen is supplied for combustion.

These control modes are selected according to the characteristics of the combustible material used and the demands of the system mentioned above such as recording rate, record thickness, hole size and contour, the capabilities of the record sensing device, etc. For instance, when pins or brushes are used to sense the presence or absence of a perforation, the hole, when present, should have a smooth contour and be of a relatively large diameter to account for some misalignment or inaccurate hole registration. On the other hand, when a photosensing system is used in conjunction with a record member produced by the invention, hole size may be smaller and the contour of the hole may still be acceptable if irregular, such as would result from using an explosive material.

Record perforating by the system of this invention must occur before the coated material, liquid or solid, loses its combustion properties. Therefore, the system utilizes continuous processing from coating to perforating. However, since only selected tape areas are ignited subsequent to coating, those portions not ignited may still retain a quantity of active compound on their surfaces. For this reason the volatile liquids are more desirable because they are sufficiently driven off during passage from ignition station 24 to take-up reel 32 of FIG. 1 so as to be of negligible concern. When solids are dispersed in a carrier, the proportion of solid in the mixture should be the least possible to permit combustion. The solids, therefore, are preferably coated subsequently with volatile oxidizers which are necessary for immediate ignition, but which can be driven off after passing the ignition station so that the solids remaining alone on the tape surface are insufficient for combustion during storage. Should metal hydrides, mentioned above, be used as a coating material, the tape is then passed through air or an oxygen-rich atmosphere before completing its travel so that those particles not ignited may oxidize in the atmosphere to become ineffectual at a later time.

While the invention has been particularly shown and described with reference to preferred embodiments thereof, it will be understood by those skilled in the art that various changes in form and details may be made therein without departing from the spirit and scope of the invention.

What is claimed is:

1. Apparatus for producing perforations in a data record member comprising:
   means for coating predetermined areas of said member with a combustible material; and
   control means for igniting and consuming selected ones of said coated areas in accordance with data to be recorded.

2. Apparatus for recording information in a continuously moving record member, comprising:
   means for moving said member continuously along a fixed path;
   a source of combustible fluid;
   coating means adjacent said member for coating said fluid on preselected areas of said member;
   supply means for supplying fluid from said source to said coating means; and
   means for igniting selected ones of said coated areas in accordance with said information and consuming said fluid and said member at said selected areas.

3. Apparatus for marking data manifestations on a record member, comprising:
   transport means for moving said record member along a fixed path;
   a source of combustible material;
   means for coating predetermined successive areas along the surface of said member with said material;
   a pair of electrodes disposed adjacent each other on opposite surfaces of said member; and
   control means connected to said electrodes for selectively producing an electrical arc between said electrodes in accordance with said data, perforating said member, and igniting and burning said material at particular ones of said coated areas.

4. Apparatus for marking a record member, comprising:
   transport means for moving said member along a fixed path;
   a source of combustible material;
   means for coating said material on areas of said member arranged as a plurality of parallel rows, each of said rows being a plurality of individual successively coated areas;
   a pair of electrodes disposed adjacent each of said rows on opposite sides of said member; and
   control means connected to each said electrode pair for selectively producing an arc between the electrodes of each said pair and igniting and burning selected ones of said areas in said rows.

5. Apparatus for marking data manifestations on a record member, comprising:
   transport means for moving said member along a fixed path;
   a source of combustible material;
   means for coating said material from said source on areas of said member arranged as a plurality of parallel rows, each said row being a plurality of individual successively coated areas;
   a pair of electrodes disposed adjacent each of said rows on opposite sides of said member;
   means for producing an arc between the electrodes of each said pair; and
   means for selectively controlling said arc producing means in accordance with data to be recorded to ignite and burn preselected ones of said areas.

6. Apparatus for marking combustible record members comprising:
   means for transporting said member along a fixed path;
   a source of combustible liquid material;
   means for repetitively depositing said material on said member as a transverse row of individual coated areas on said member to form a plurality of parallel columns of areas longitudinally of said member;
   means for supplying said material from said source to said depositing means;
   means for drying said coated areas of said member;
   a pair of electrodes for each said column, each said pair being disposed adjacent to its respective column of coated areas on opposite sides of said member;

cyclically operable arcing means connected to each said electrode pair for producing an arc between the electrodes of each said pair;

control means connected to each said arc means for selectively controlling said arc means to ignite and initiate combustion of said material at preselected ones of said coated areas;

means for supporting combustion of said ignited areas;

means for extinguishing said ignited areas after a predetermined time interval of combustion of said areas; and means for removing the combustion residue of said ignited areas.

7. Apparatus for marking a combustible record member, comprising:

transport means for moving said member along a designated path;

a source of combustion-inhibiting substance;

means for printing said substance about the periphery of predetermined surface portions of said member;

a combustible material;

means adjacent said path for coating said predetermined surface portions of said member with said material; and means for selectively igniting said material to initiate combustion thereof at said predetermined surface portions.

8. Apparatus for marking a record member, comprising:

transport means for moving said record member along a fixed path;

a source of combustible material;

means for coating predetermined successive areas along the surface of said member with said material;

a pair of electrodes disposed adjacent each other on opposite surfaces of said member;

control means connected to said electrodes for selectively producing an electrical arc between said electrodes perforating said member, and igniting and consuming said material at particular ones of said coated areas; and means for extinguishing said ignited areas after a predetermined time.

9. Apparatus as described in claim 8 further comprising means for removing the residue of the consumed material at said ignited areas.

References Cited by the Examiner

UNITED STATES PATENTS

| | | | |
|---|---|---|---|
| 2,707,744 | 5/55 | Meaker | 219—19 |
| 3,737,882 | 3/56 | Early et al. | 101—3 |
| 2,763,759 | 9/56 | Sanai Mito et al. | 219—384 |
| 2,779,654 | 1/57 | Williamson | 346—33 |
| 2,903,545 | 9/59 | Heinrich | 219—19 |
| 2,982,186 | 5/61 | McKeen | 219—19 |

FOREIGN PATENTS

| | | |
|---|---|---|
| 593,891 | 10/47 | Great Britain. |
| 624,738 | 6/49 | Great Britain. |

LEYLAND M. MARTIN, *Primary Examiner.*

EMIL G. ANDERSON, LEO SMILOW, *Examiners.*